US006817827B2

(12) United States Patent
Targonski

(10) Patent No.: US 6,817,827 B2
(45) Date of Patent: Nov. 16, 2004

(54) LIFTING APPARATUS WITH STABILIZER

(76) Inventor: Frank Targonski, 21 Chestnut Rd., Verona, NJ (US) 07044

(*) Notice: Subject to any disclaimer, the term of this patent is extended or adjusted under 35 U.S.C. 154(b) by 0 days.

(21) Appl. No.: 10/349,669

(22) Filed: Jan. 23, 2003

(65) Prior Publication Data

US 2004/0146387 A1 Jul. 29, 2004

(51) Int. Cl.[7] .................................................. B65G 9/00

(52) U.S. Cl. ........................ 414/639; 414/654; 254/3 R

(58) Field of Search ................................ 414/639, 654, 414/655; 254/3 R, 3 C, 133 R, DIG. 4

(56) References Cited

U.S. PATENT DOCUMENTS

| | | | | |
|---|---|---|---|---|
| 1,271,594 A | | 7/1918 | McKee | |
| 1,951,096 A | | 3/1934 | Liston et al. | 254/108 |
| 2,469,670 A | | 5/1949 | Thompson | 254/133 |
| 2,899,093 A | * | 8/1959 | Morrell | 414/639 |
| 3,387,731 A | * | 6/1968 | Gibson et al. | 414/639 |
| 3,416,682 A | | 12/1968 | Pezzuti | 214/370 |
| 3,567,054 A | * | 3/1971 | Emke | 414/639 |
| 3,662,994 A | | 5/1972 | Johns | 254/93 R |
| 3,939,999 A | | 2/1976 | Nielson | 214/370 |
| D252,808 S | | 9/1979 | Prater | D12/34 |
| 4,475,758 A | * | 10/1984 | Paulsson | 414/639 |
| 4,728,245 A | | 3/1988 | Shelton | 414/490 |
| 5,131,629 A | | 7/1992 | Hillhouse | 254/133 R |
| 5,181,694 A | | 1/1993 | Collins | 254/133 R |
| 5,261,643 A | | 11/1993 | Wurdack | 254/106 |
| 5,379,987 A | | 1/1995 | Cleary | 254/134 |
| 5,385,335 A | | 1/1995 | Wurdack | 254/1 |
| 5,547,035 A | | 8/1996 | Berry | 180/19.2 |
| 5,829,948 A | | 11/1998 | Becklund | 414/607 |
| 5,855,360 A | | 1/1999 | Wurdack | 254/100 |
| 5,915,670 A | | 6/1999 | Cain | 254/89 H |
| 5,947,449 A | | 9/1999 | Dube et al. | 254/134 |
| D416,471 S | | 11/1999 | Wurdack | D8/363 |
| 6,272,853 B1 | | 8/2001 | Broechmann | 60/414 |
| 6,402,454 B1 | | 6/2002 | Yamaguchi et al. | 414/661 |
| 6,478,529 B1 | * | 11/2002 | Willey et al. | 414/639 |

OTHER PUBLICATIONS

Shinn Fu Corporation, Omega Lift Equipment Catalog, Heavy Duty Hydraulic Forklift Jacks & Toe Jacks; p. 22 (2 pages) .

Simplex, A Division of Templeton, Kenly & Co., Inc. Hydraulic and Mechanical Power for Industry Catalog, p. 87 (2 pages).

SPX PowerTeam, Professional Hydraulic Tools and Supplies Catalog, Bottle Jacks and Toe Jacks, pp. 92–95 (5 pages).

* cited by examiner

*Primary Examiner*—James R. Bidwell
(74) *Attorney, Agent, or Firm*—Wolff & Samson PC

(57) ABSTRACT

A lifting apparatus having a stabilizer for providing support and stabilization during lifting of an object is provided. A conventional lifting mechanism, such as a hydraulic, pneumatic, or mechanical jack, provides force for lifting an object and is attached at a top end to the stabilizer. The stabilizer comprises an upright portion including a shoulder for attaching the stabilizer to the lifting mechanism, a toe portion near the bottom end of the upright portion, an adjustable stabilizing arm for providing support and stabilization, and a mechanism for adjusting the upright arm. The toe portion can be positioned underneath the object to be moved, and the upright arm moved against the side of the object. Support and stabilization of the lifting apparatus and the object is provided by the stabilizer during lifting and when the object is suspended above the floor.

29 Claims, 4 Drawing Sheets

LIFTING APPARATUS WITH STABILIZER

BACKGROUND OF THE INVENTION

1. Field of the Invention

The present invention relates to a lifting apparatus. More specifically, the invention relates to a lifting apparatus having a stabilizing member for providing stabilization and support during lifting of furniture and other objects.

2. Related Art

A variety of lifting devices for lifting large objects, such as furniture, are known in the art. Generally, these devices allow objects to be lifted off of a floor surface so that the floor underneath the object is accessible. Providing access to the floor underneath the object is advantageous in numerous situations, such as for allowing carpet underneath the object to be replaced and for allowing access to wiring channels, outlets, ducts, and other similar objects existing underneath the object and embedded within the floor surface. Moreover, lifting the object by means of a lifting device obviates the need to physically move and/or drag the object across the floor to a different location, thereby saving physical effort and strain and preventing against potential physical injury.

A particular problem with existing lifting devices is that stabilization is not provided while lifting objects. For example, most lifting devices only provide for vertical lifting of objects, and do not provide lateral support for the object being lifted and/or the lifting device during lifting. Moreover, present lifting devices do not include a stabilizer portion that can be adjusted to accommodate and support objects of various sizes, shapes, and weights during lifting. As can be readily appreciated, objects such as furniture, desks, cabinets, etc., have different shapes, and there is thus a need to accommodate and support such shapes when lifting same.

Accordingly, what would be desirable, but has not yet been provided, is a lifting apparatus having a stabilizing member to stabilize and support the lifting apparatus during lifting.

SUMMARY OF THE INVENTION

The present invention relates to a lifting apparatus having a stabilizer for supporting and stabilizing the lifting apparatus during lifting of an object. A conventional lifting mechanism, such as a hydraulic, pneumatic, or mechanical jack, provides a lifting force to a piston. A stabilizer is attached to the piston. The stabilizer comprises an upright portion including a shoulder portion for attachment to the piston, a toe portion having a forked configuration at the bottom end of the upright portion, an adjustable stabilizing arm for providing support and stabilization, and an adjustment mechanism for adjusting the stabilizing arm. The adjustment mechanism could comprise a threaded rod threadably engaged with the upright portion at one end and mounted to the stabilizing arm at the other end. A knob on the adjustment mechanism allows the threaded rod to be rotated to move the stabilizing arm towards or away from the upright portion to contact an object being lifted to stabilize the device. The threaded rod could be pivotably attached to an upper end of the stabilizing arm via a pivotable mount. The bottom end of the stabilizing arm is preferably hingedly attached to the upright portion or the toe portion. The toe portion is preferably set on an angle with respect to the jack to aid stabilization.

During operation, a location on the object to be lifted is identified, and the lifting apparatus is brought near the location. The apparatus is then tilted towards the object, so that the angled bottom face of the toe portion is flush with the floor surface. The toe portion of the lifting apparatus is then slid between the bottom surface of the object to be lifted and the floor. Once the toe is positioned, the adjustable stabilizing arm is moved against the side of the object to provide lateral support by turning the knob of the adjustment mechanism. The threaded rod of the adjustment mechanism, when turned, urges the stabilizing arm against the object. The lifting mechanism is then activated (e.g., hydraulically, pneumatically, or by pumping a hand lever), and the object is lifted above the floor surface to allow access thereto. The stabilizer provides support and stabilization to the lifting device while the object is being lifted, and maintains same when lifting ceases and the object is at a desired height. The angled toe portion provides additional stabilization.

BRIEF DESCRIPTION OF THE DRAWINGS

These and other important objects and features of the invention will be apparent from the following Detailed Description of the Invention, taken in connection with the accompanying drawings, in which.

DETAILED DESCRIPTION OF THE INVENTION

The present invention relates to a lifting apparatus having a stabilizer for providing support and stabilization during lifting. The lifting apparatus comprises a conventional lifting mechanism, such as a hydraulic, pneumatic, or mechanical jack. The jack has a piston that can be moved up and down. A stabilizer is attached to the piston. The stabilizer comprises an upright portion including a shoulder for attachment to the piston, a toe portion at the bottom end of the upright portion, an adjustable stabilizing arm for providing support and stabilization, and an adjustment mechanism for adjusting the stabilizing arm. The toe portion is preferably set on an angle with respect to a horizontal floor. The toe portion can be positioned underneath the object to be lifted, and the stabilizing arm moved against the side of the object. The lifting mechanism can then be activated to lift the object above the floor surface. Support and stabilization is provided by the stabilizer during lifting and when the object is suspended above the floor.

Figure 1:
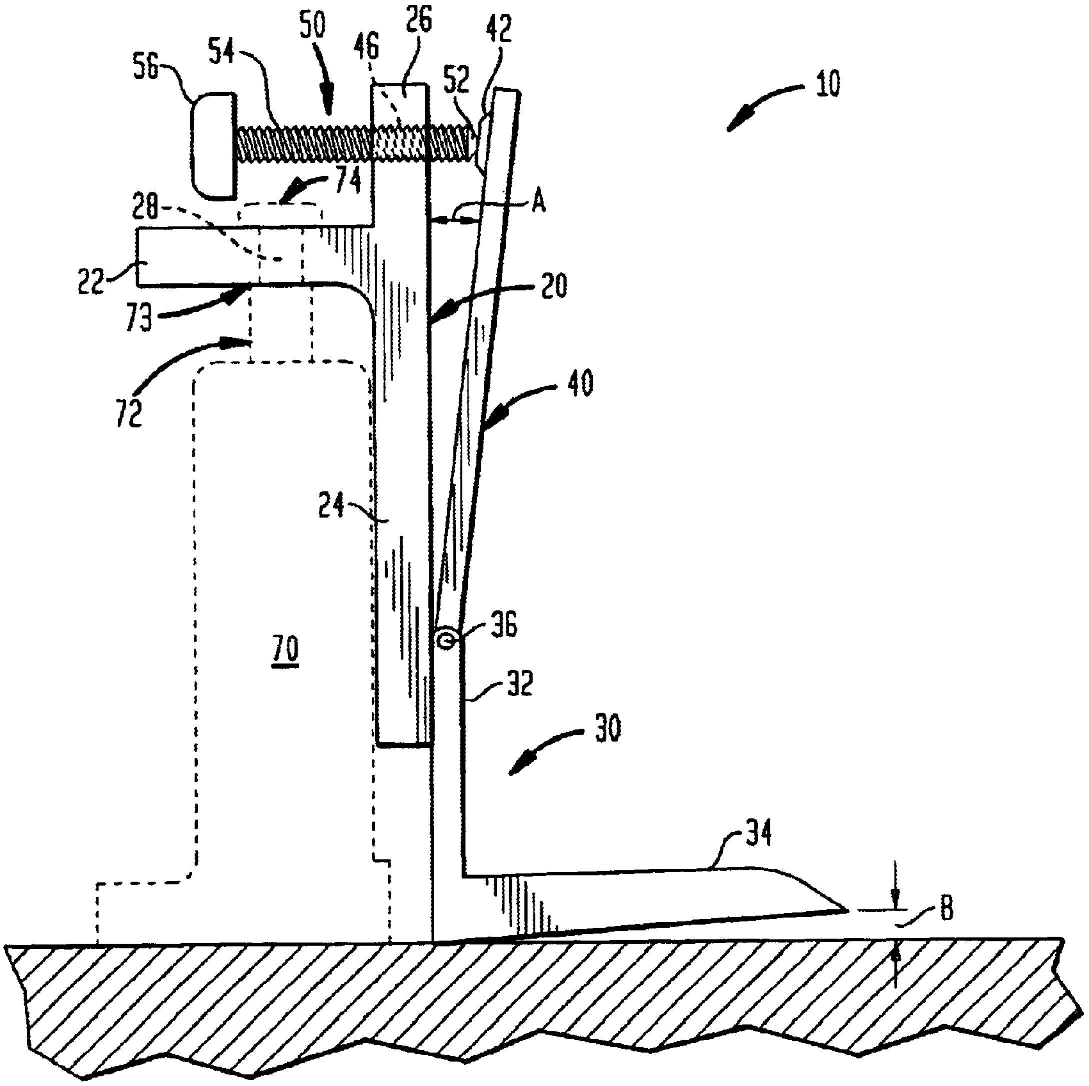
FIG. 1 is a side view showing the lifting apparatus of the present invention.

FIG. 1 is a side view showing the lifting apparatus of the present invention, indicated generally at 10. The lifting apparatus 10 comprises a stabilizer formed by an upright portion 20, a toe portion 30, an adjustable stabilizing arm 40, and adjustment mechanism 50 for moving the stabilizing arm 40 against the side of an object to be lifted. A shoulder 22 of the upright portion 20 allows the stabilizer of the present invention to be attached to and operated with a conventional lifting mechanism 70. The lifting mechanism 70 could be any lifting mechanism known in the art, such as a hydraulic, pneumatic, or mechanical jack. One example of a lifting mechanism 70 that can be used is the CRAFTSMAN 950280 2 ton, 4,000 lb. capacity jack. Of course, any other suitable lifting mechanism could be used without departing from the spirit or scope of the present invention. Such a lifting mechanism 70 includes a piston 72 for providing upward force for lifting objects.

The stabilizer can be interconnected with the piston 72 in any known manner. One way to interconnect the piston 72 with the stabilizer is to insert the piston 72 through an aperture 28 in the shoulder 22. A flange 73 on the piston 72 bears against the shoulder 22. A cap 74 is provided on the end of the piston 72, above the shoulder 22. The cap 74 could be welded onto the piston, or otherwise attached. Other configurations for mounting the stabilizer on the lifting mechanism 70 are considered within the spirit and scope of the present invention.

The toe portion 30 is attached to the bottom end of the vertical member 24 of the upright portion 20, typically by welding, although it could be formed integrally with the upright portion 20. The toe portion 30 comprises a vertical portion 32 and a horizontal portion 34 that form a generally L-shaped piece. The horizontal portion 34 preferably includes a bottom face that is angled at an angle B with respect to the floor surface. This provides for increased stability to the device during lifting because it prevents the object from creeping or sliding down the toe portion 30, which could cause the lifting apparatus to kick outward. The angle B could be any desired angle, generally a few degrees as necessary to counteract the tendency of an object to slide. It has been found that an angle of about 6 to 8 degrees is suitable, but the angle could be varied as desired. Indeed, the present invention can be practiced even if the toe portion 30 is not angled. The top face of the horizontal portion 34 is preferably tapered at one end to allow the horizontal portion 34 to be wedged in between the floor and the bottom surface of the object to be moved.

The top end of the vertical portion 32 of the toe portion 30 preferably includes a pin 36 for hingedly interconnecting the stabilizing arm 40 to the toe portion 30. Of course, if the toe portion 30 is formed integrally with the vertical portion 32, the hinged connection could be located anywhere along the vertical portion 32. The hinged interconnection allows the stabilizing arm 40 to swing away from the upright portion 20 along the direction indicated generally by arrow A, and bear against the side of an object being moved to provide support and stabilization. An upper end of the stabilizing arm 40 is interconnected with adjustment mechanism 50 via a mount 42. The mount 42 could be, for example, a ball and socket joint, or any other suitable connection.

The adjustment mechanism 50 could be configured in any known way. For example, a threaded rod 54 could be threaded through an aperture 46 located on the top portion 26 of the upright portion 20. When rotated, the threaded rod 54 moves laterally with respect to the upright portion 20, and bears against the stabilizing arm 40. This causes the stabilizing arm 40 to be biased against the object, providing stabilization for the lifting apparatus 10. A knob 56 could be provided at an end of the threaded rod 54 to allow grasping by a user for rotating the threaded rod 54. The opposite end 52 of the threaded rod 54 could be engaged with the stabilizing arm by the mount 42, to link the threaded rod 54 to the stabilizing arm 40 and allow the stabilizing arm 40 to move along the direction A as the threaded rod 54 is advanced and retracted by rotating the knob 56 in a desired direction. Other adjustment mechanisms can be used, such as a plunger with serrated edges extending through an aperture in the central upright portion with matching serrated edges, the edges being movable into and out of engagement to move the plunger and to fix the position of the plunger.

In a preferred embodiment of the present invention, the upright portion 20, the toe portion 30, and the stabilizing arm 40 are manufactured from a high-impact metal, such as steel, and are preferably welded together. Of course, other means of attachment, such as rivets, screws, bolts, or other similar attachments, could be used. Further, the toe portion 30 and the central upright portion 20 could be fabricated as a single, unitary piece to which the stabilizing arm 40 is attached.

Figure 2:
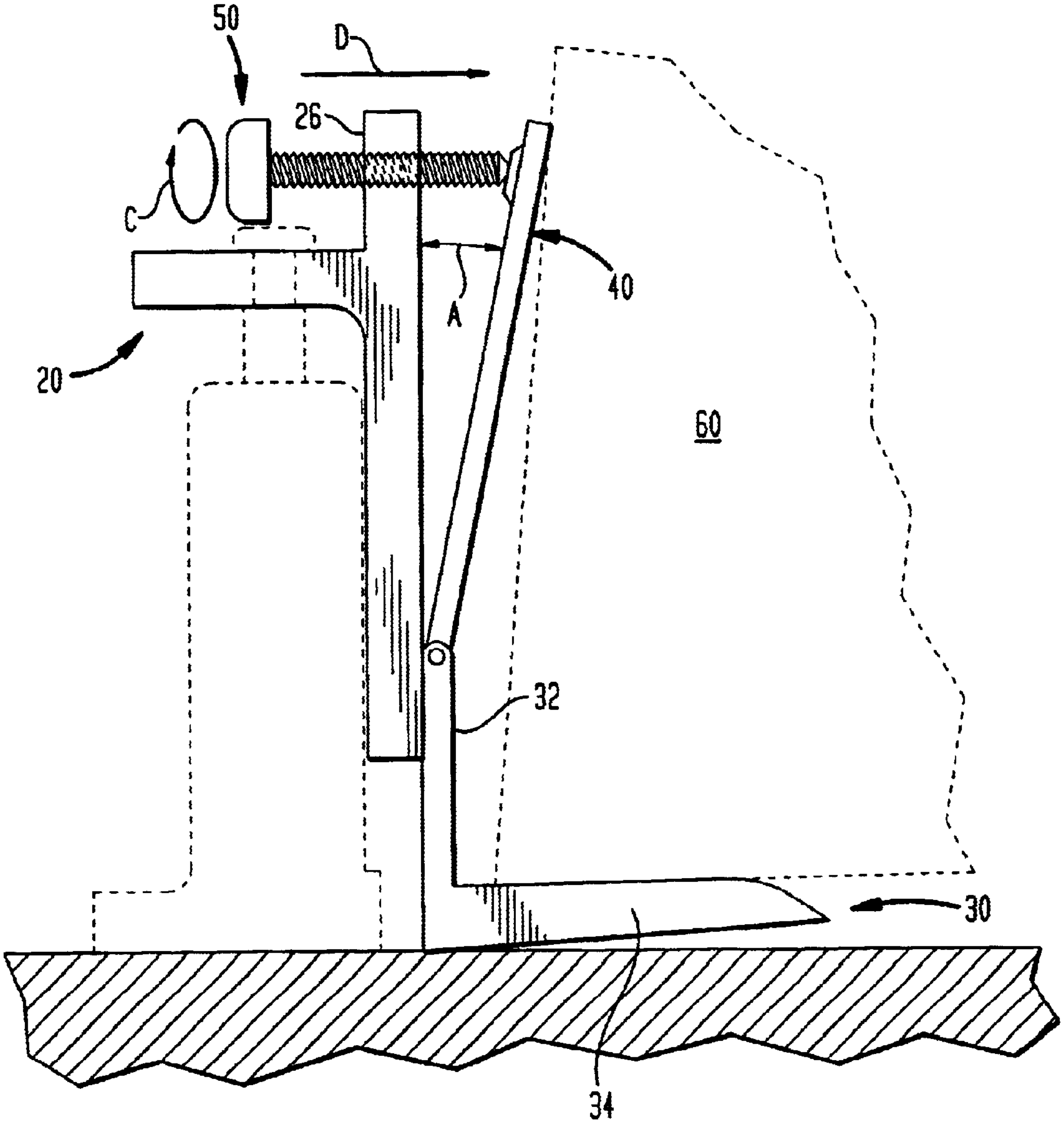
FIG. 2 is a side view showing the lifting apparatus of the present invention, wherein the toe portion is positioned underneath an object to be moved and the upright arm is secured against a side of the object to provide support and stabilization.

FIG. 2 is a side view showing the lifting apparatus of the present invention, wherein the horizontal portion 34 of the toe portion 30 is positioned underneath an object 60, and the stabilizing arm 40 is positioned against a side of the object 60 to provide support and stabilization. The lifting apparatus of the present invention can be tipped toward the object 60, so that the bottom face of the horizontal portion 34 of the toe portion 30 is flush with the floor surface. Then, the horizontal portion 34 is wedged between the floor and the bottom surface of the object 60, so that the toe portion 30 is positioned therebetween. Once the object 60 is positioned on the toe portion 30 (e.g., the object 60 is positioned sufficiently close to the vertical portion 32 of the toe portion 30 such that the object 60 will not fall or tip off of the toe portion 30 during lifting), the stabilizing arm 40 is moved against the side of the object 60 to provide support and stabilization.

To position the stabilizing arm 40 against the side of the object 60, a user grasps the knob of the adjustment mechanism 50, and rotates same in the direction indicated generally by arrow C. This movement causes the threaded rod 54 to move laterally in the direction indicated generally by arrow D, and exerts force on the top end of the upright arm 40. The force causes the stabilizing arm 40 to move along the direction indicated by arrow A, and to bear against the side of the object 60 to provide support and stabilization. Importantly, this support and stabilization helps to prevent the object 60 from moving when lifted and, once lifting is complete, during suspension above the floor surface, thereby stabilizing the lifting device.

It should be noted that the stabilizing arm 40 of the present invention need not be hingedly interconnected with the toe portion 30. Indeed, a single, generally vertical plate of any desired shape could be provided and attached to the adjustment mechanism 50, thereby obviating the need for a hinged interconnection between the stabilizing arm 40 and the toe portion 30. Preferably, in such an arrangement, the plate would be interconnected with the adjustment mechanism 50 via an interconnection that allows the plate to spin freely with respect to the adjustment mechanism 50 (e.g., a swivel connection). Thus, when the plate makes contact with the object 60, it is frictionally retained in place but allows the adjustment mechanism 50 to be rotated to exert additional force against the object 60.

Figure 3:
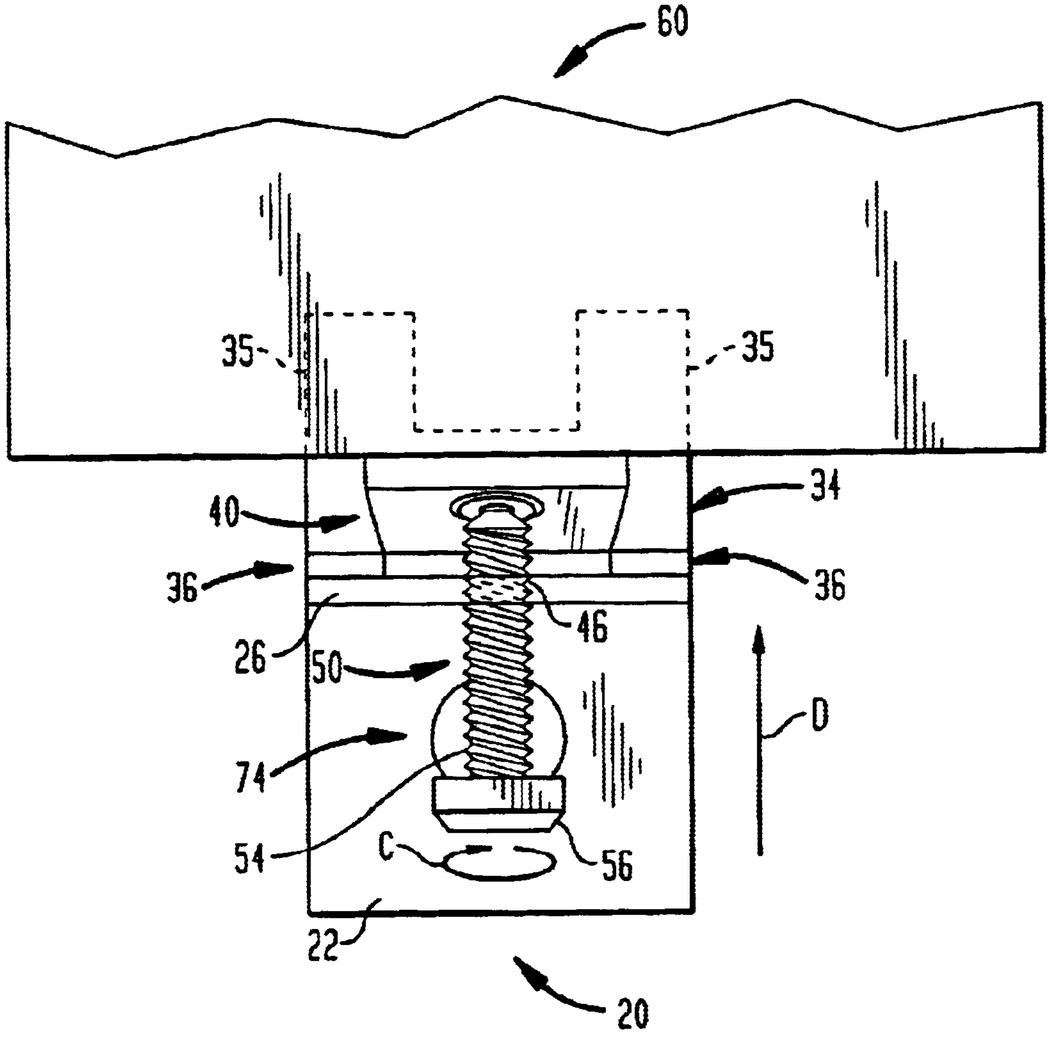
FIG. 3 is a top view of the lifting apparatus shown in FIG. 2.

FIG. 3 is a top view of the lifting apparatus shown in FIG. 2. As mentioned previously, the horizontal portion 34 of the toe portion 30 of the present invention is positioned underneath the object 60 and between the object 60 and a floor surface prior to lifting, so that the object 60 rests on the horizontal portion 34. The horizontal portion 34 could be fork-shaped, and could include two prongs 35. When the object 60 is positioned on the horizontal portion 34 (and the prongs 35, if provided), the upright arm 40 is moved against the object 60 by rotating the knob 56 of the adjustment mechanism 50 in the general direction indicated by arrow C. This causes the threaded rod 54 to move laterally along the direction indicated by arrow D, and urges the top portion of the stabilizing arm 40 against the object 60, providing support and stabilization.

Figure 4:
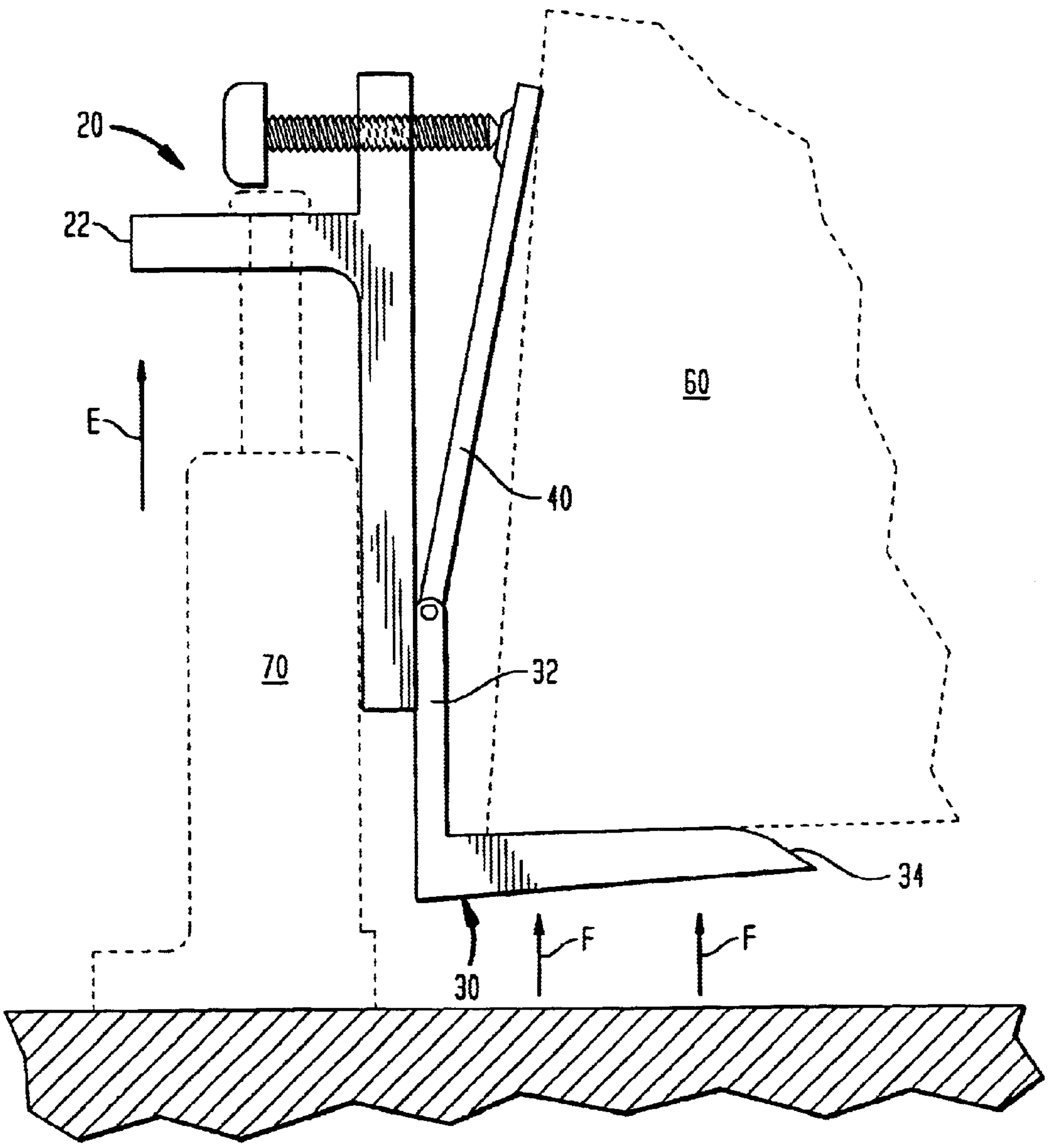
FIG. 4 is a side view of the lifting apparatus of the present invention, wherein the object is lifted above a floor surface and support and stabilization is provided during lifting.

FIG. 4 is a side view of the lifting apparatus of the present invention, wherein the object 60 is lifted above a floor surface and support and stabilization is provided during lifting. When the object 60 is positioned on the toe portion 30, and the stabilizing arm 40 is moved against the object 60, the lifting mechanism 70 is activated, causing the piston 72 to move upward along the general direction indicated by arrow E. The upward movement of piston 72 causes the entire stabilizer of the present invention, in addition to the object 60 resting on the toe portion 30 of the stabilizer, to move upward in the direction indicated by the arrow F. While being lifted away from the floor surface, support and stabilization is provided. The angle B of the toe reduces the tendency of the object to slide or creep off of the toe, adding to the stabilization of the lifting device. The stabilizing arm 40 prevents the lifting apparatus 10 from kicking out of place or otherwise moving when the object 60 is being lifted. Further, when the object 60 has been lifted to a desired height, continued support and stabilization is provided as the object 60 is suspended above the floor surface. Access to the floor surface underneath the object 60 is thus provided, allowing, for example, a new floor surface or carpet to be installed or a recessed/embedded utility outlet, duct, or channel within the floor to be accessed.

Having thus described the invention in detail, it is to be understood that the foregoing description is not intended to limit the spirit and scope thereof. What is desired to be protected by Letters Patent is set forth in the appended claims.

What is claimed is:

1. A lifting apparatus comprising:

a lifting mechanism for providing upward force for lifting an object;

an upright portion connected to the lifting mechanism;

a toe portion at a bottom end of the upright portion, the toe portion including a horizontal portion for insertion between a bottom surface of the object and a floor surface;

a stabilizing arm for providing support for the object during lifting, the stabilizing arm moveable away from the upright portion and with respect to the toe portion: and means for moving the stabilizing arm against the object.

2. The apparatus of claim 1, wherein the upright portion further comprises a shoulder for interconnecting the upright portion to the lifting mechanism.

3. The apparatus of claim 2, wherein the shoulder is interconnected with a movable part of the lifting mechanism.

4. The apparatus of claim 1, wherein the toe portion is set at an angle with respect to a floor.

5. The apparatus of claim 1, wherein an end of the horizontal portion of the toe portion is tapered to allow the toe portion to be slid between the bottom surface of the object and the floor surface.

6. The apparatus of claim 1, wherein the stabilizing arm is hingedly interconnected with the upright portion.

7. The apparatus of claim 1, wherein the means for moving the stabilizing arm comprises a threaded rod retained by a threaded aperture located proximal to an upper end of the upright portion.

8. The apparatus of claim 7, wherein the means for moving the stabilizing arm further comprises a pivotable mount pivotably interconnecting an end of the threaded rod to an upper end of the stabilizing arm.

9. The apparatus of claim 8, wherein the pivotable mount comprises a ball and socket joint.

10. The apparatus of claim 7, wherein the means for moving the stabilizing arm further comprises a knob connected to an end of the threaded rod.

11. The apparatus of claim 10, wherein when the knob is rotated by a user, the threaded rod advances along the threaded aperture and urges the stabilizing arm against the object to stabilize and support the lifting apparatus.

12. An apparatus for stabilizing a lifting mechanism comprising:

an upright portion connected to the lifting mechanism;

a toe portion at a bottom end of the upright portion, the toe portion including a horizontal portion for insertion between a bottom surface of the object and a floor surface;

a stabilizing arm moveable away from the upright portion and with respect to the toe portion; and means for moving and retracting the stabilizing arm.

13. The apparatus of claim 12, wherein the toe portion includes an angled bottom face for allowing the apparatus to be tilted toward the object.

14. The apparatus of claim 13, wherein an end of the horizontal portion of the toe portion is tapered to allow the toe portion to be slid between the bottom surface of the object and the floor surface.

15. The apparatus of claim 12, further comprising a hinged connection between the stabilizing arm and the upright portion.

16. The apparatus of claim 12, wherein the means for moving and retracting the stabilizing arm comprises a threaded rod retained by a threaded aperture located proximal to an upper end of the upright portion.

17. The apparatus of claim 16, wherein the means moving and retracting the stabilizing arm comprises a pivotable mount between the threaded rod and the stabilizing arm.

18. The apparatus of claim 17, wherein the pivotable mount comprises a ball and socket joint.

19. The apparatus of claim 17, wherein the means for moving and retracting the stabilizing arm comprises a knob.

20. The apparatus of claim 19, wherein when the knob is rotated by a user, the threaded rod advances along the threaded aperture and urges the stabilizing arm against the object.

21. A method for stabilizing an object during lifting comprising:

providing a lifting apparatus having a lifting mechanism, a toe portion, and a stabilizing arm moveable with respect to the toe portion;

sliding the toe portion of the lifting apparatus underneath a bottom surface of the object;

moving the stabilizing arm against the object; and activating the lifting mechanism to lift the object.

22. The method of claim 21, wherein the step of moving the stabilizing arm further comprising turning a knob to urge a threaded rod against the stabilizing arm to move the stabilizing arm against the object.

23. An apparatus for stabilizing a lifting mechanism comprising:

an upright portion connected to the lifting mechanism;

a toe portion at a bottom end of the upright portion, the toe portion including a horizontal portion for insertion between a bottom surface of the object and a floor surface;

a stabilizing arm moveable away from, and retractable towards, the upright portion; and means for moving and retracting the stabilizing arm, said means including a threaded rod retained by a threaded aperture located proximal to an upper end of the upright portion.

24. The apparatus of claim 23, wherein the means for moving and retracting the stabilizing arm comprises a pivotable mount between the threaded rod and the stabilizing arm.

25. The apparatus of claim 24, wherein the pivotable mount comprises a ball and socket joint.

26. The apparatus of claim 24, wherein the means for moving and retracting the stabilizing arm comprises a knob.

27. The apparatus of claim 26, wherein when the knob is rotated by a user, the threaded rod advances along the threaded aperture and urges the stabilizing arm against the object.

28. A method for stabilizing an object during lifting comprising:

providing a lifting apparatus having a lifting mechanism, a toe portion, and a stabilizing arm;

sliding the toe portion of the lifting apparatus underneath a bottom surface of the object;

turning a knob of the lifting apparatus to urge a threaded rod against the stabilizing arm to move the stabilizing arm against the object; and activating the lifting mechanism to lift the object.

29. A lifting apparatus comprising:

a lifting mechanism for providing upward force for lifting an object;

an upright portion connected to the lifting mechanism;

a toe portion fixedly attached to a bottom end of the upright portion;

a stabilizing arm moveable with respect to the upright portion for providing support for the object during lifting; and means for moving the stabilizing arm against the object.

* * * * *